United States Patent [19]
Hawley, Jr. et al.

[11] 3,916,319
[45] Oct. 28, 1975

[54] ADAPTIVE SWEEP GENERATOR FOR A SPECTRUM ANALYZER

[75] Inventors: Irving Hurd Hawley, Jr., Sebastopol; Siegfried Helmut Linkwitz, Santa Rosa; Michael Stanley Marzalek, San Jose, all of Calif.; William Livingston Hale, Denver, Colo.

[73] Assignee: Hewlett-Packard Company, Palo Alto, Calif.

[22] Filed: June 19, 1974

[21] Appl. No.: 480,991

[52] U.S. Cl. .................. 325/470; 324/77 D
[51] Int. Cl.² ............................ G01R 27/02
[58] Field of Search ............... 334/18, 16, 22, 26; 324/77 R, 77 B, 77 C, 77 D; 325/335, 469, 470, 471

[56] References Cited
UNITED STATES PATENTS

| | | | |
|---|---|---|---|
| 3,201,696 | 8/1965 | Sharp | 325/469 X |
| 3,456,197 | 7/1969 | Schulz | 325/470 X |
| 3,550,009 | 12/1970 | French | 325/469 X |
| 3,596,193 | 7/1971 | Dunwoodie | 325/335 X |

*Primary Examiner*—Benedict V. Safourek
*Attorney, Agent, or Firm*—Patrick J. Barrett

[57] ABSTRACT

A spectrum analyzer is provided with a horizontal sweep generator that causes the analyzer to sweep at a fast rate when no signal is being detected. When a signal is detected the sweep generator stops sweeping, backs up and tunes the spectrum analyzer slowly through the detected signal to produce a calibrated display. After the signal has been detected and the analyzer has been tuned beyond it, the sweep rate is again increased until another signal is encountered.

7 Claims, 4 Drawing Figures

ADAPTIVE SWEEP GENERATOR FOR A SPECTRUM ANALYZER

BACKGROUND OF THE INVENTION

A spectrum analyzer is a swept receiver. Usually a local oscillator in the receiver is swept across a range of frequencies and the output is displayed on a cathode ray tube or XY recorder to show signal amplitude versus frequency. A spectrum analyzer can be adjusted to sweep over various portions of the frequency spectrum at various selectable rates and the detected signals can usually be displayed with varying amounts of resolution, depending upon the bandwidth of the IF filters in the receiver. The rate at which a spectrum analyzer can be swept across a band of frequencies depends in large measure on the bandwidth of the IF filters since the rise time of the filters is dependent on their bandwidth. If the spectrum analyzer is swept too fast, the IF filters will not have enough time to respond completely to a detected signal and the displayed amplitude of the signal on the CRT or XY recorder will be incorrect. In addition to this incorrect display of amplitude, the signal will also appear shifted in frequency since the IF filter will still be giving an output after the receiver has been tuned past the signal. Thus, the sweep or tuning rate of a spectrum analyzer must be chosen as a function of the IF bandwidth for proper display of the detected information.

In the prior art several different solutions to the problem have been attempted. Some spectrum analyzers simply depend upon the ability of the operator to observe an incorrect display of information on the CRT. Some spectrum analyzers have incorporated warning lights that signal the spectrum analyzer operator when the controls are set incorrectly for a properly calibrated response. In other spectrum analyzers the sweep rate controls and bandwidth are mechanically coupled together to preserve the proper relationship. While the foregoing measures do help insure that the spectrum analyzer operator will get a properly calibrated display, it may take an undesirably long time to sweep across a relatively wide portion of the spectrum with relatively narrow IF bandwidth when the controls are properly set. This is particularly a problem when a CRT display is used since the operator sees only a slowly moving dot and must either take a photograph of the CRT display or use a more expensive storage type display device. In addition, it may mean that the operator has to wait for several seconds or even several minutes to find out whether there is a signal of interest in the portion of the spectrum being scanned.

One solution that has been proposed in the past to alleviate these limitations is a system to slow the sweep of the spectrum analyzer when a signal is detected. This allows the spectrum analyzer to be swept at a faster than normal rate when no signals are detected so that less time is consumed looking for a signal over a relatively broad portion of the spectrum when narrow bandwidth filters are used. Such a system is illustrated in U.S. Pat. No. 2,507,525 entitled Panoramic System. A serious limitation of this system, however, is the fact that the sweep is not slowed until after the signal is detected, thus making at least part of the signal display uncalibrated in both frequency and amplitude. In addition, the entire display of the detected signal is likely to be uncalibrated because the sudden change in sweep rate will introduce additional transients that will appear to be part of the detected signal.

SUMMARY OF THE INVENTION

According to a preferred embodiment of the present invention, a sweep generator circuit is provided in a spectrum analyzer for sweeping the spectrum analyzer at a faster than normal rate when no signals are being detected. The operator selects a sweep rate from the spectrum analyzer controls that will give a calibrated response when a signal is detected. During the time that no signal is present, the sweep generator automatically sweeps the analyzer at approximately 20 to 25 times the selected sweep rate. When a signal is detected, the sweep is stopped and is backed-up by an amount that depends on the bandwidth of the IF filter. This backing-up of the sweep allows the spectrum analyzer to sweep through the entire signal at the slower rate so that a calibrated display results. After the sweep is backed-up, there is a short pause during which any transient signals in the IF filter are allowed to settle; and then the spectrum analyzer sweeps slowly through the region of interest at the rate selected by the operator. After the sweep has passed the detected signal by a predetermined amount, the sweep is again speeded up until another signal is detected. Using this sweep generator, the user of the spectrum analyzer can more quickly determine where signals of interest are in the spectrum and what their amplitudes are than with prior art spectrum analyzers.

DETAILED DESCRIPTION OF THE PREFERRED EMBODIMENT

Figure 1:
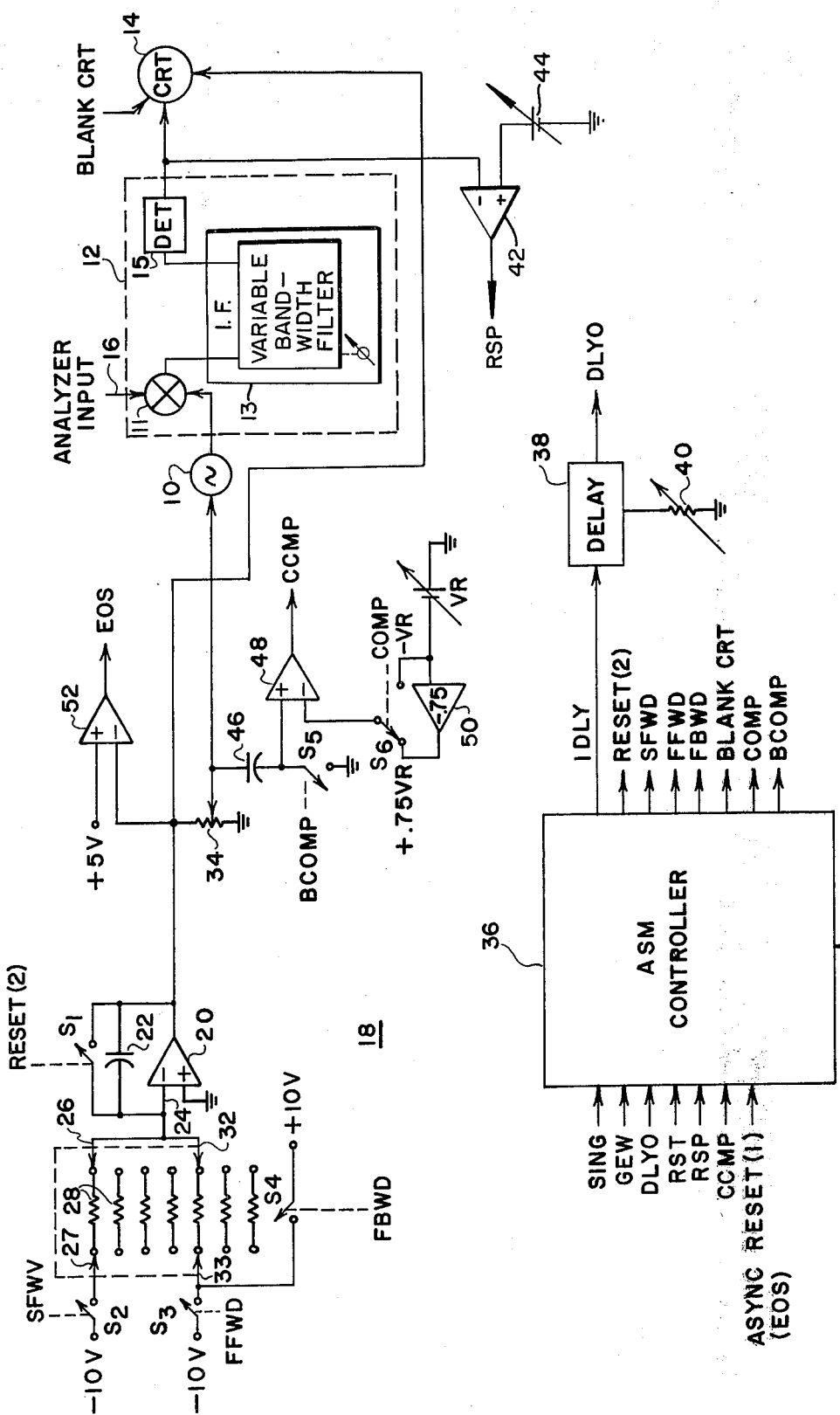
FIG. 1 shows a block, schematic diagram of a preferred embodiment of the present invention.
Figure 2:
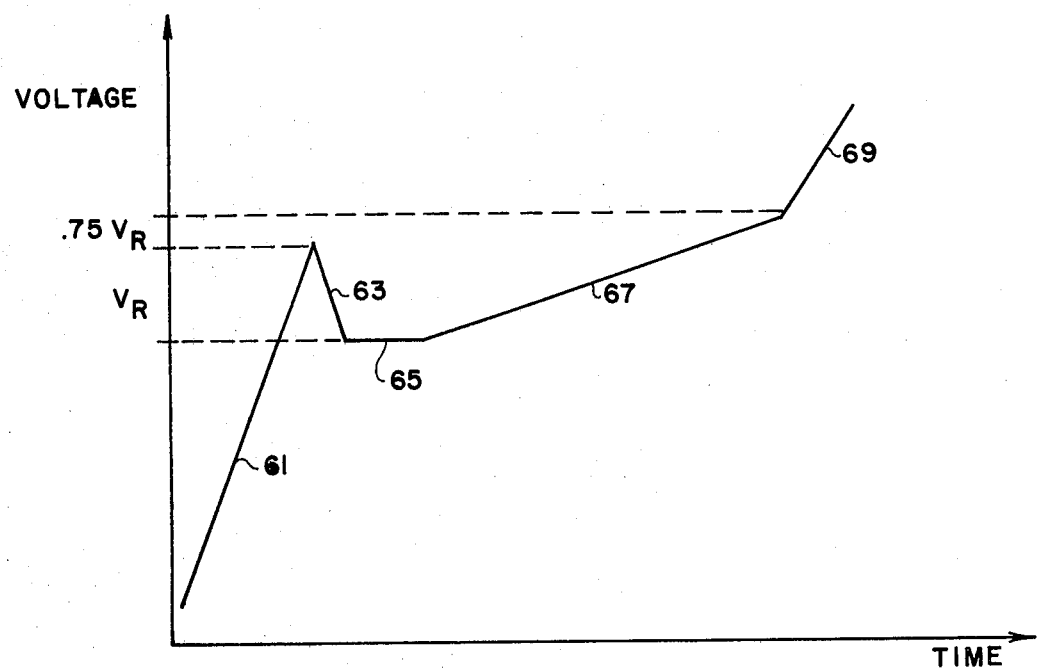
FIG. 2 shows a graph of the operation of the device shown in FIG. 1.
Figure 3:
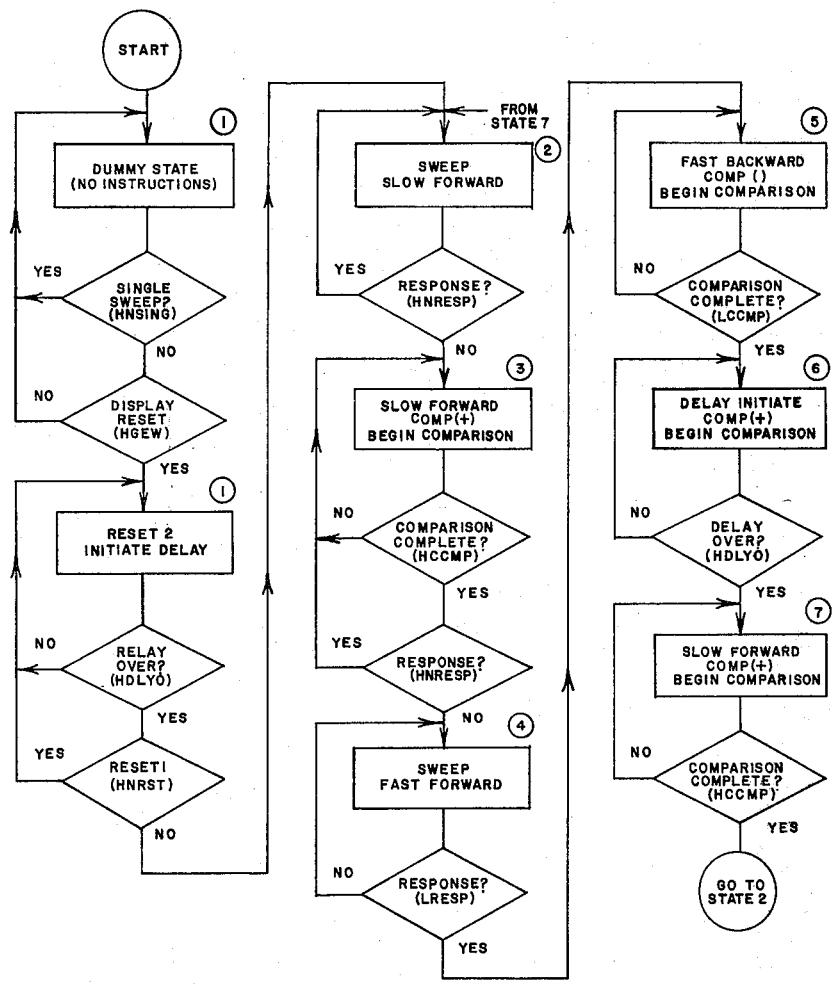
FIG. 3 shows a logical flow diagram of the operation of the ASM controller shown in FIG. 1.

Reference is made to FIGS. 1, 2, and 3 in the following description. A spectrum analyzer may be simply represented as a voltage controlled oscillator 10 coupled to a mixer 11, IF circuits 13, and a detector 15, shown grouped together as circuits 12 which in turn are coupled to a display device such as a cathode ray tube (CRT)14. A signal at an input 16 is mixed with the signal from VCO 10 and the intermediate frequency signal is detected in detector 15 after passing through IF 13 which includes a bandpass IF filter that determines the bandwidth of the spectrum analyzer. This detected signal provides the vertical input to CRT 14. VCO 10 is driven by a sweep generator 18 which provides an increasing voltage with time to change the frequency of the VCO, and this voltage is also applied to the horizontal deflection circuitry of the CRT.

A sweep signal may be generated by applying a constant current to the input of an integrator since the output of the integrator will be a voltage ramp that increases linearly with time. As shown in FIG. 1, an operational amplifier 20 has a feedback capacitor 22 connected between its input and output to make an integrator. Its inverting input 24 is connected to gauged switches 26 and 32 which in turn be connected to any of a plurality of resistors 28. These resistors may be connected to a voltage source here shown as −10 volts through switches $S_2$ and 27 to provide various currents to the integrator. The sweep signal may be reset by closing switch $S_1$ to short the voltage across capacitor 22. Current signals for sweeping the spectrum analyzer at normal sweep rates for a calibrated output are provided by resistors 28 connected to the −10 volts source through switches 26, 27 and $S_2$. Another set of switches, 32, 33 and $S_3$, connect smaller values of resistors to input 24. Through these switches, resistors may be connected either to a −10 volt or a +10 volt source by closing switches $S_3$ or $S_4$ respectively to provide current signals for the fast sweep rates. Depending on the gradation of resistor values between switches 26 and 32, the increase in sweep rate can be selected to be about 20 to 25 times the normal sweep rate. The output of amplifier 20 is connected to VCO 10 through an attenuator 34 to properly scale the output voltage for sweeping the VCO over the desired range of frequencies.

Figure 4:
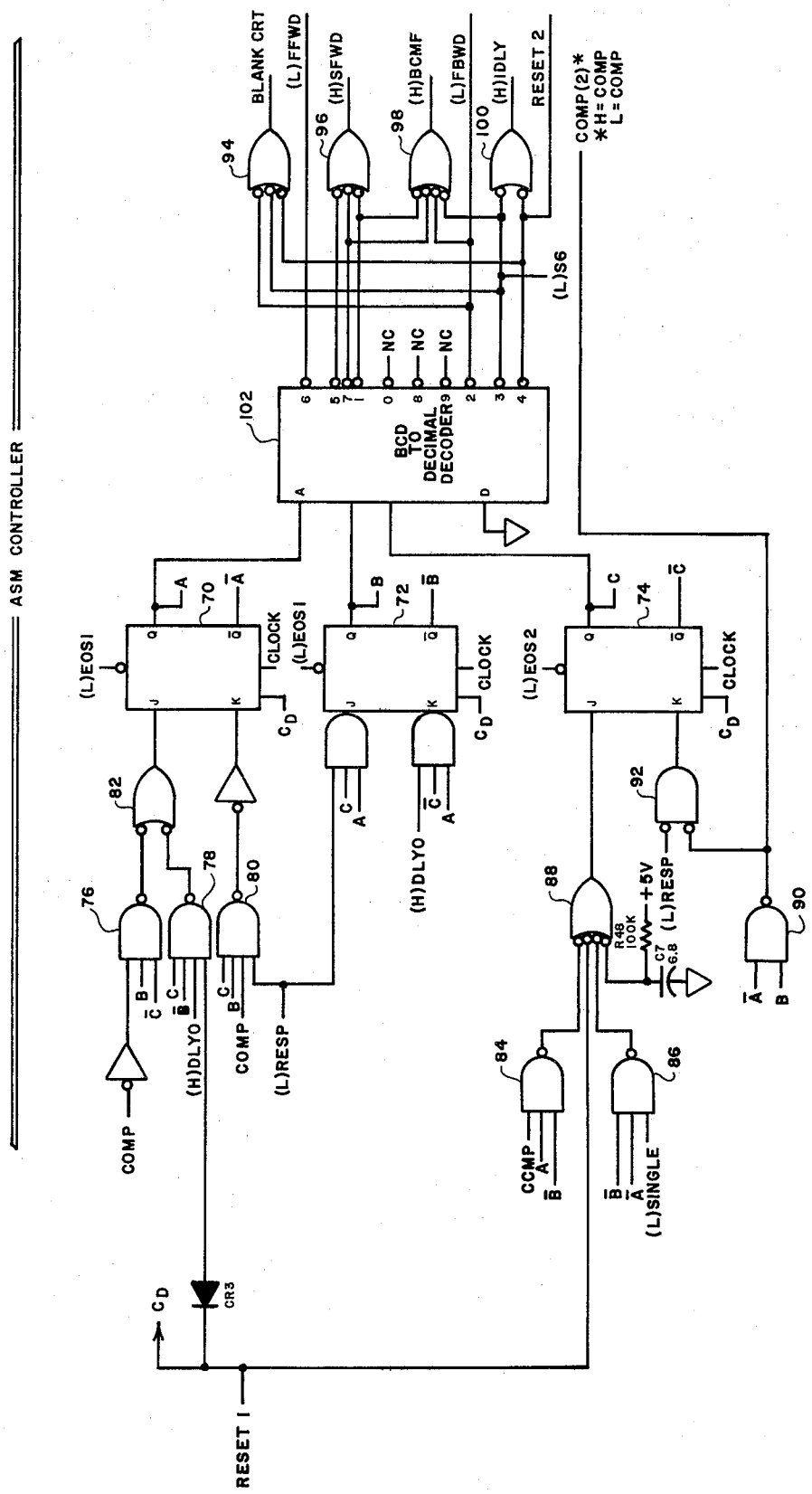
FIG. 4 shows a schematic diagram of the preferred embodiment of the ASM controller shown in FIG. 1.

Switches $S_1$ through $S_4$ as well as several other switches that will subsequently be discussed are electronically controlled and may comprise, for example, bipolar or field-effect transistors. The control electrode of these switches is connected to one of several outputs of an ASM controller 36. The connections of these various switches are indicated for simplicity by various mnemonic codes written by the ASM controller outputs and connected to the respective switches by dashed lines. The ASM controller operates in accordance with a flow chart shown in FIG. 3 and an illustrative embodiment is shown in FIG. 4.

At the beginning of a sweep, the ASM controller will be in state 0 and will first check to see if the spectrum analyzer is in a normal sweep mode, which calls for repetitive sweeps, or in a single sweep mode. If the analyzer is in a single sweep mode, the controller remains in the initial state and allows the spectrum analyzer to sweep. If the spectrum analyzer is in the normal sweep mode and the display has been reset, as was assumed previously, the controller will move to state 1 which will initiate a delay in the sweep to make sure that any signals in the bandwidth filters in IF 13 have settled. The delay is initiated by a logically high signal on the ASM controller output labelled IDLY which is connected to the input of delay circuit 38. This delay circuit may simply comprise a monostable multivibrator with a variable time-delay element. The variable time-delay element is illustrated as resistor 40 and the amount of delay depends on the IF bandwidth filter setting since the amount of settling time required by the filter depends on the filter bandwidth. Resistor 40 is ordinarily connected to the same switch that selects the IF bandwidth filters. The output of delay circuit 38 labelled DLYO is connected to the DLYO input of the ASM controller to signal when the delay is over. At the end of the delay, when this signal goes high, the controller again checks for a reset signal. If there is no further reset signal, the controller passes to state 2 which causes the sweep generator to sweep slowly forward, that is, at the normal rate.

Sweeping slowly forward is effected by a high signal on the SFWD output which closes switch $S_2$ connecting resistors 28 to the −10 volt supply. With the spectrum analyzer now sweeping forward, the ASM controller will check for a response and this function will be discussed more completely subsequently. If there is no response, it will then pass to the sweep fast forward state 4 causing a high output signal to appear on the FFWD output.

The FFWD signal causes switch $S_3$ to close and, at the time the FFWD signal appears, the SFWD signal is removed causing switch $S_2$ to open. A higher current is now applied to input 24 through resistors 28 since a lower value resistor has been selected by switches 32 and 33, and the spectrum analyzer sweeps at a rate 20 to 25 times faster than it was initially sweeping. This is illustrated as portion 61 on the graph in FIG. 2.

During the forward sweep of the spectrum analyzer the output of detector 15 is displayed on CRT 14. This same output is connected to a comparator 42 which compares the signal amplitude against an adjustable voltage reference 44. Adjustable voltage reference 44 is normally adjusted by the spectrum analyzer user so that the base line on the CRT, which usually represents the noise level, does not cause the spectrum analyzer sweep to slow down. Thus, only when a signal that is greater than the threshold established by the variable reference voltage will comparator 42 produce an output. A logically low output from this comparator indicated that a response has been detected and causes ASM controller 36 to change to state 5 and start sweeping the VCO backward at the same fast rate that it was sweeping forward. The backward sweep is shown as portion 63 of the curve in FIG. 2.

The sweep generator circuit should be swept backward a sufficient amount so that the spectrum analyzer will sweep over all of the detected signal at the slower sweep rate. In order to do this, the amount of back-up will depend on the bandwidth of the IF filter, since the resolution of a signal by the spectrum analyzer is directly proportional to this bandwidth. Because the sweep voltage signal supplied to VCO 10 is directly proportional to frequency increments, the back-up circuitry can simply provide a fixed back-up voltage for each different bandwidth. The back-up voltage to be used is selected with the same front panel control that selects the bandwidth of the IF filters and is shown as a variable voltage source VR. Now, during the time of the forward sweep, switch $S_5$ has been closed and the lower electrode of capacitor 46 has been held at ground potential. When the sweep is backed-up after ASM controller 36 receives a low RSP signal from comparator 42, the ASM controller also opens switch $S_5$ by the BCOMP signal and connects switch $S_6$ to VR in response to the COMP signal. The output of a comparator 48 connected both to VR and to the lower electrode of capacitor 46 applies a signal to the CCMP input of the ASM controller to keep it in the backup mode until the sweep has been backed-up by an amount equal to the voltage VR. The lower electrode of capacitor 46 will be at VR after the sweep has been backed-up by that amount since that electrode is not grounded during the back-up.

When ASM controller receives signal CCMP indicating that the back-up has been completed, it changes to state 6 to initiate the delay with signal IDLY. The sweep is completely stopped by opening switch $S_4$, with switches $S_1$, $S_2$, and $S_3$ also remaining open. This halt in the sweep is shown as portion 65 in FIG. 2. The delay lasts for an amount of time dependent on the IF bandwidth being used so that the filter can settle. The amount of delay time is selected by a resistor 40 as explained previously. When the delay is over, as indicated by signal DLYO, the ASM controller changes to state 7 and switch $S_2$ is closed to start the forward sweep. At the same time, switch $S_6$ is changed to connect comparator 48 to the output of an inverting multiplier 50 to apply 0.75VR to the inverting input of comparator 48. This comparison voltage insures that the sweep will proceed at the slow, i.e., calibrated rate, to a point at least 75% of the back-up distance beyond the point where the signal was first detected, no matter how narrow the response may be. Portion 67 in FIG. 2 illustrates this operation. This extra slow sweep forward helps insure that the system does not get into a lock-up mode where it continually sweeps forward and backward about a given point. The number 0.75 was chosen as optimum in the preferred embodiment; however, other values could be used.

When the point 175% of VR beyond the step-back point is reached, the ASM controller moves back to state 2, comparator 48 gives a CCMP(+) signal and switch $S_5$ is again closed to connect the lower terminal of capacitor 46 to ground. The sweep will remain slow however, until the RSP signal from comparator 42 again goes high, indicating that a response is no longer being detected. At this time the ASM controller will pass to state 3, switch $S_5$ will again be opened and comparator 48 will force the sweep to continue in the slow forward mode until it is 0.75VR past the point where the response ended. This condition is imposed at the beginning of each sweep also so that the spectrum analyzer will time 0.75VR past the lowest frequency to avoid the effects of any signal at or just below that frequency. Once there is no longer a response detected and the 0.75VR comparison is complete, the controller will again change states to the fast forward mode, state 4, opening switch $S_2$ and closing switches $S_3$ and $S_5$. FIG. 2 shows the resumption of the fast forward sweep at portion 69.

During the time of the backward sweep, the BLANK CRT output of ASM controller 36 will cause the CRT to be blanked so that a confusing display does not appear on CRT 14. After the delay caused by delay 38, the BLANK CRT signal will be removed from the CRT.

When the sweep has proceeded all the way across CRT 14, it must be reset to start again at the left-hand edge of the screen. For this purpose the sweep voltage is compared with the maximum value, here indicated as 5 volts, in a comparator 52. When the sweep voltage reaches 5 volts, and end-of-sweep signal EOS is applied to an asynchronous reset input of ASM controller 36 to cause switches $S_2$, $S_3$, and $S_4$ to open and switch $S_1$ to close, thus shorting the signal across capacitor 22 and starting the voltage ramp over again. The BLANK CRT signal is also applied to the CRT during the time of the voltage ramp reset.

As shown in FIG. 4, ASM controller 36 may comprise three J-K flip-flops 70, 72, and 74 connected to the encoding and decoding gates. The logic states of the three J-K flip-flops define the eight states of the ASM controller numbered 0 through 7 in FIG. 3 since three binary digits provide eight states. The outputs of the J-K flip-flops are connected to the input of a BCD to decimal decoder 102 which converts the three binary inputs to one out of ten outputs. Since only eight states are used there is no connection to outputs 8 and 9 nor is there an output to state 0 since it is a dummy state. Each of the inputs to ASM controller 36 shown in FIG. 1 is connected to the inputs of one or more of the logic gates 76 through 92 which in turn are connected to either the J or the K inputs of flip-flops 70 through 74. The AND and OR gates shown combine the inputs to the ASM controller in order to get the results called for in the flow chart of FIG. 3. The outputs of the BCD to decimal decoder are likewise connected to OR gates 94 through 100 to produce the output signals shown in FIG. 1.

In addition to the input signals connected to gates 76 through 92 there is one asynchronous signal reset 1 which is also connected to the clear direct $C_D$ inputs of each of the flip-flops to return the ASM controller to the 0 state any time a reset 1 signal is generated. Flip-flops 70 through 74 are driven by a periodic clock signal and state changes take place in synchronism with this clock but only when the proper asynchronous conditions exist on the flip-flop inputs. The clock frequency is high enough, typically 55 KHz, so that there is little delay between state changes and changes in the input conditions.

We claim:
1. A scan voltage generator for a swept frequency receiver having tuning and detecting circuits, the scan voltage generator comprising:
   ramp generator means connected to the tuning circuit for generating a voltage ramp;
   first rate control means connected to the ramp generator means for causing the ramp generator means to generate a first voltage ramp to tune the receiver at a first rate;
   second rate control means connected to the ramp generator means for causing the ramp generator means to generate a second voltage ramp to tune the receiver at a second rate slower than the first rate;
   reversing means connected to the ramp generator means for causing the ramp generator means to reverse the direction of the voltage ramp;
   signal detection means connected to the detecting circuits for indicating that the receiver has detected a signal; and
   logic control means connected to the first and second rate control means, the reversing means and the signal detection means for energizing the first rate control means when the signal detection means is not indicating the detection of a signal and for sequentially energizing the reversing means and the second rate control means when the signal detection means is indicating the detection of a signal so that the receiver tunes back past the detected signal before tuning at the second slower rate.

2. A scan voltage generator as in claim 1 wherein the logic means energizes the first rate control means subsequent to energization of the second rate control means after the signal detection means has ceased indicating the detection of a signal.

3. A scan voltage generator as in claim 2 wherein the receiver includes a variable bandwidth filter and selection means for selecting the bandwidth of the bandwidth filter and the scan voltage generator includes comparator means connected to the selection means and the logic control means for energizing the reversing means to cause the ramp generator means to reverse the direction of the voltage ramp for a preselected period of time dependent on the bandwidth selected by the selection means.

4. A scan voltage generator as in claim 3 wherein the comparator means is also connected to the logic means for energizing the second rate control means subsequent to the energization of the reversing means until the voltage ramp has attained a value greater than the value at which the reversing means was energized.

5. A scan voltage generator as in claim 4 including a delay means connected to the selection means and the logic control means for delaying the energization of the second rate control means after energization of the reversing means for the preselected period of time, the delay period being dependent on the bandwidth selected by the selection means.

6. A scan voltage generator as in claim 5 wherein the ramp generator means comprises an integrator, a first voltage source, and a plurality of resistors; the first rate control means comprises switching means for connecting first selected ones of the plurality of resistors between the first voltage source and the integrator; and the second rate control means comprises switching means for connecting corresponding second selected ones of the plurality of resistors between the first voltage source and the integrator, wherein each of the first selected ones of the plurality of resistors is smaller than each of the corresponding second selected ones of the plurality of resistors by a preselected factor.

7. A scan voltage generator as in claim 6 wherein the preselected factor is in the range of 20 to 25 times.

* * * * *

UNITED STATES PATENT AND TRADEMARK OFFICE
CERTIFICATE OF CORRECTION

PATENT NO. : 3,916,319
DATED : October 28, 1975
INVENTOR(S) : Irving Hurd Hawley, Jr. et al It is certified that error appears in the above-identified patent and that said Letters Patent are hereby corrected as shown below:

Column 2, line 67, after "which" insert -- may --;

Column 3, line 8, "volts" should read -- volt --;

Column 5, line 49, "and" should read -- an --.

Signed and Sealed this tenth Day of February 1976

[SEAL]

Attest:

RUTH C. MASON
Attesting Officer

C. MARSHALL DANN
Commissioner of Patents and Trademarks